United States Patent [19]

McKenna

[11] 4,021,400
[45] May 3, 1977

[54] ALKYL ACRYLATE POLYMER HAVING LESS ODOR

[75] Inventor: James Michael McKenna, Hockessin, Del.

[73] Assignee: E. I. Du Pont de Nemours and Company, Wilmington, Del.

[22] Filed: Aug. 18, 1975

[21] Appl. No.: 605,415

[52] U.S. Cl. .................... 260/30.2; 260/30.4 A; 260/30.4 R; 260/889; 260/DIG. 19; 526/5; 526/6; 526/318; 528/492
[51] Int. Cl.² .................................... C08F 6/00
[58] Field of Search .............. 260/30.4 R, 30.4 A, 260/30.2, 78.5 Z, 89.5 S, DIG. 19, 889; 450/770.5; 528/492

[56] References Cited
UNITED STATES PATENTS 2,599,123   6/1952   Pinkney .................... 260/78.5

Primary Examiner—Stanford M. Levin

[57] ABSTRACT

Compositions containing copolymers of ethylene, alkyl acrylate and monoalkyl esters of 1,4-butenedioic acid and compounds having the formula

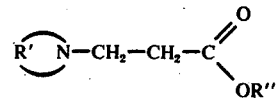

formed by reacting the minor amount of alkyl acrylate monomer entrained in the copolymer with a secondary amine of the formula

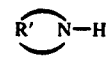

are less odorous than are compositions containing the unreacted alkyl acrylate monomer.

10 Claims, No Drawings

ALKYL ACRYLATE POLYMER HAVING LESS ODOR

This invention relates to a curable composition containing a polymer of ethylene/alkyl acrylate/monoalkyl ester of 1,4-butenedioic acid that is less odorous than known compositions, and to the process of preparing such a composition.

It is known in the art to form copolymers of ethylene, alkyl acrylate and monoalkyl esters of 1,4-butenedioic acid, for example, see Pinkney U.S. Pat. No. 2,599,123. Greene Belgian Pat. No. 818,609 discloses such polymers in which the polymerized units are arranged in the polymer molecule in a random fashion. Polymers of this class can be cured with crosslinking agents, such as diamines and peroxides, to yield elastomeric products having desirable properties. These polymers as manufactured contain small amounts of residual, unpolymerized alkyl acrylates which volatilize slowly during storage and processing. Since methyl and ethyl acrylate are highly odoriferous, handling the polymer requires the use of special procedure to avoid creating an unpleasant environment. To remove this monomer by the mechanical techniques, such as vacuum treatment would be expensive and would require the use of specialized equipment. The present invention provides a process whereby the unpolymerized alkyl acrylate monomer content is reduced further than has been commercially feasible earlier. The present invention thus also provides a composition that is substantially more odor free than the compositions of this type that were previously known.

These low odor compositions are achieved by reacting the unpolymerized residual alkyl acrylate with a class of secondary amine compounds. These compounds appear to react selectively with the acrylate monomers, and rapidly enough that a large excess of the amine compound is not required. Furthermore, the reaction product of the amine compound and the acrylate does not interfere significantly with subsequent curing or use of the polymer. Likewise, any residual unreacted amine does not significantly interfere with curing or use of the polymer.

Thus the present invention is a process which may be summarized as follows:

The process for reducing the odor of a polymer of ethylene, alkyl acrylate and a monoalkyl ester of 1,4-butenedioic acid where the alkyl acrylate is selected from the class consisting of methyl acrylate and ethyl acrylate, and the alkyl groups of the ester contain 1 to 6 carbon atoms containing minor amounts of the monomeric alkyl acrylate which comprises combining with the polymer a secondary amine having the formula

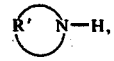

where R' is an organic diradical having at least 4 carbon atoms, under conditions such that at least a portion of the alkyl acrylate monomer reacts with the secondary amine to form a compound having the formula

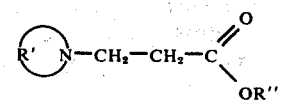

where R'' is an alkyl group of the same size as the alkyl group of the alkyl acrylate.

And the present invention also is a composition which may be summarized as follows:

A composition comprising (a) a copolymer of polymerized ethylene units, polymerized alkyl acrylate units and polymerized units of a monoalkyl ester of 1,4-butenedioic acid, said alkyl acrylate units being selected from the class consisting of methyl acrylate and ethyl acrylate, the alkyl group of the ester having 1 to 6 carbon atoms, said alkyl acrylate units being present in the amount of 40 to 65% by weight of the polymer, said monoalkyl ester units being present in the amount of 1 to 10% by weight of the polymer, said ethylene units being present in a complemental amount, said polymer having a melt index of 0.3 to 100 grams/10 min. as determined at 190° C. by the method of ASTM-D-1238 52T and (b) a compound having the formula

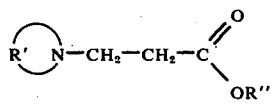

where R' is an organic diradical containing at least 4 carbon atoms, and R'' is an alkyl group of the same size as the alkyl group of the alkyl acrylate, said compound being present in the amount of between about 0.15 and 2% by weight of the composition.

The copolymers employed as the starting materials are those known in the art, for example see the Greene Belgian patent. Normally the alkyl acrylate content of the copolymers is in the range of about 40 to 65% by weight of the copolymer, the monoalkyl ester of 1,4-butenedioic acid is about 1 to 10% by weight of the polymer and the remainder of the polymer is normally ethylene. Minor amounts of other monomers can be present to achieve modifications in some properties of the polymer if desired. Such polymers, after removal of most of the unpolymerized alkyl acrylate by the use of reduced pressure flashing after exiting the reactor, will contain minor amounts, usually about 0.3 to 1% by weight alkyl acrylate. Further reduction in the alkyl acrylate monomer content of the polymer is not economically attractive. It has now been determined that the alkyl acrylate monomer content can be rendered non-volatile and/or non-odorous by treatment of the polymer containing the alkyl acrylate with a secondary amine having the formula

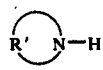

where R' is a divalent organic radical having at least 4 carbon atoms. Suitable secondary amines include morpholine, pyrrolidine, piperidine, homopiperidine, 1,2,3,4-tetrahydroisoquinoline, ethyl isonipecotate, α-pipecoline, 4-benzylpiperidine, 1-benzylpiperazine, and 1,2,3,6-tetrahydropyridine. Thus it is apparent that R' usually is an alkylene group containing 4 to 6 carbon atoms, but it may be part of another ring system, may contain a second nitrogen atom, may contain an oxygen atom, or may contain unsaturated substituent groups, or may contain alkyl groups.

The speed of the reaction of the alkyl acrylate and the secondary amine is temperature dependent. Thus at a temperature of about 130° C. the reaction is fairly rapid, while at lower temperatures the reaction is slower, but even at room temperature the reaction takes place. Since there is a considerable period of time between the manufacture of the polymer and its further processing, it is not essential that the addition of the secondary amine to the polymer be carried out under conditions such that the reaction will proceed at a rapid rate. Thus the mixing of the secondary amine and the polymer can take place at below room temperature (about 25° C.) to above 180° C.

The amount of secondary amine added to the polymer can vary over fairly wide limits, but normally the amount would be at least equal on a molar basis to one-half of the alkyl acrylate monomer content entrained in the polymer, and it is often desirable to add considerably more than this amount — even 10 times the equal molar amount may be used to insure that the alkyl acrylate monomer is substantially completely reacted with the secondary amine; however, 1 to 3 times as much secondary amine as alkyl acrylate monomer is more often the amount employed.

The reaction product of the secondary amine and the alkyl acrylate has the following formula:

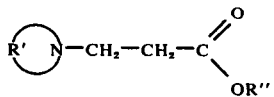

where R' is a divalent organic radical having at least 4 carbon atoms, and R" is methyl or ethyl depending on whether the alkyl acrylate monomer was methyl acrylate or ethyl acrylate. This reaction product is much less volatile and thus the odor is reduced substantially. The amount of this reaction product in the polymer will, of course, vary, depending on the amount of alkyl acrylate monomer initially present and on the amount of secondary amine added, but it will usually be present in the amount of about 0.12 to 2% by weight of the composition.

The presence of

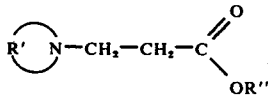

and residual secondary amine does not interfere with the diamine curing of the polymer nor does it affect the quality of the resulting vulcanizate. The presence of these compounds does reduce somewhat the efficiency of a peroxide curing system. If a peroxide cure is to be employed then the inclusion of between 0.3 and 5 parts per 100 parts of the polymer of a low molecular weight (about 1000 to 3000) polybutadiene resin containing a high level of pendant vinyl groups (above about 85% by weight pendant vinyl groups) will increase the efficiency of the peroxide cure. Such polybutadienes are commercially available in the trade, for example, Hystl resins are satisfactory.

In the following examples all parts and percentages are in parts by weight and all temperatures in degrees centigrade, unless otherwise stated.

EXAMPLES

EXAMPLE 1

A copolymer of 42.5–39.5 wt. % ethylene/54–56% methyl acrylate/3.5–4.5 ethyl hydrogen maleate made in a commercial plant test was treated by injecting morpholine into an extruder operated so that the exit stream from the extruder was at 165°–175° C. The extruder had a length to diameter ratio of 14.5. The average residence time for the polymer in the extruder was 30 to 45 seconds. The results are shown below.

| Moles Morpholine Injected per Mole Unreacted Methyl Acrylate | Wt. % Unreacted Methyl Acrylate Remaining X Days After Production | |
|---|---|---|
| | $X = 0$ to $7$ | $X = 120-130$ |
| 0 | 0.34 | 0.22 |
| 0.5–1.0 | 0.27 | 0.13 |
| 1.0–2.0 | 0.16 | 0.03 |

A sample of the polymers of this Example 1 which had been treated with morpholine (0.5–1.0 moles amine/mole unreacted methyl acrylate) was compounded in a commercial size Banbury mixer (~450 lb. capacity). One hundred parts polymer was mixed with about 28 parts of a mixture of commercial processing oils. The mix cycle was ~12 minutes with a final polymer temperature of 121° C. when removed from the Banbury to the processing mill. Analyses of methyl acrylate and morpholine in the mill area environment were performed using a Miran I Infrared Analyzer (Wilks Scientific Co.). The atmosphere in the mill area was continuously sampled and the air stream analyzed at 8.35 microns for methyl acrylate and 9.00 microns for morpholine. The instrument was standardized with samples of known concentration. Copolymer which was not treated with morpholine during manufacture was processed the same way to compare methyl acrylate levels. The results are shown below.

| Copolymer | PPM Methyl Acrylate | |
|---|---|---|
| | In Mill Nip Area | In Operator Area |
| Untreated | >20 | 2–3 |
| Morpholine treated | 4 | nil |
| | PPM Morpholine | |
| Morpholine treated | — | >2 |

EXAMPLE 2

Random ethylene/methyl acrylate/ethyl hydrogen maleate copolymers of the indicated composition and shown in Tables I and II of melt index (at 190° C.) 3.9–4.9 gm/10 min., containing small amounts (less than 1 wt. %) of unreacted methyl acrylate monomer were mixed with various secondary cycloaliphatic amines. The mixing was done by means of a ~270 gm capacity Banbury mixer at 130° C. and 72 rpm. The polymer was preheated 1 minute, the amine added, and mixing continued for 4 more minutes. The polymer was analyzed for unreacted methyl acrylate by a gas chromatographic method. The accuracy of the method was found to be ± 10% relative. Tables I and II illustrate the results obtained with various secondary cycloaliphatic amines.

TABLE I

| Amine | Moles Amine Added Per Moles Residual Methyl Acrylate | Wt. % Residual Methyl Acrylate | % Residual Methyl Acrylate Removed by Mixing and Reaction |
|---|---|---|---|
| — | 0 | 0.17 | 18 |
| Pyrrolidine | 5.3 | 0.17 | 66 |
|  | 2.6 | 0.17 | 33 |
| Piperidine | 6.6 | 0.17 | 100 |
|  | 4.4 | 0.17 | 73 |
|  | 2.2 | 0.17 | 76 |
| Morpholine | 6.5 | 0.17 | 100 |
|  | 2.1 | 0.17 | 65 |
| Homopiperidine | 6 | 0.17 | 48 |
| 1,2,3,4-Tetrahydro-isoquinoline | 5.7 | 0.17 | 72 |
| Ethyl isonipecotate | 3.5 | 0.17 | 83 |
| γ-Pipecoline | 5.6 | 0.17 | 71 |
| 4-Benzylpiperidine | 4.2 | 0.17 | 71 |
| 1-Benzylpiperazine | 4.2 | 0.17 | 65 |

| Polymer Composition | |
|---|---|
| Methyl Acrylate | 53.5 wt. % |
| Ethylene | 43.0 |
| Ethyl Hydrogen Maleate | 3.5 |
| Melt Index at 190° C., ~ 3.8 gm./10 min. | |

TABLE II

| Amine | Moles Amine Added Per Moles Residual Methyl Acrylate | Wt. % Residual Methyl Acrylate | % Residual Methyl Acrylate Removed by Mixing and Reaction |
|---|---|---|---|
| — | 0 | 0.36 | 34 |
| Morpholine | 1.6 | 0.36 | 62 |
| 1,2,3,4-Tetrahydro-isoquinoline | 1.7 | 0.36 | 53 |
| Ethyl isonipecotate | 1.7 | 0.36 | 58 |
| γ-Pipecoline | 1.7 | 0.36 | 49 |
| 4-Benzylpiperidine | 1.7 | 0.36 | 65 |
| 1,2,3,6-Tetrahydropyridine | 5.3 | 0.36 | 91 |

| Polymer Composition | |
|---|---|
| Methyl Acrylate | 54.1–57.4 wt. % |
| Ethylene | 38.6–41.9 |
| Ethyl Hydrogen Maleate | 4.03 |
| Melt Index at 190° C., | 4.53 gm/10 min. |

EXAMPLE 3

A 50 gram sample of polymer with approximate composition 53% methyl acrylate, 5% ethyl hydrogen maleate, and the balance ethylene was mixed in a Brabender plastograph, at a rotor speed of 50 rpm and a temperature of 150° C. To illustrate the effect of the amine an additional 0.3 ml of methyl acrylate monomer was mixed into the polymer for 1 minute prior to the addition of the amine. Mixing continued for 2¼ minutes after addition of the amine. Results are shown below.

| Amine | Wt. % Methyl Acrylate Remaining After Treatment | Wt. % Methyl Acrylate Remaining After 6 Months Storage at Room Temperature |
|---|---|---|
| None | 0.5, 0.6 | 0.22, 0.35 |
| 0.5 gm Morpholine | 0.42 | 0.05 |
| 1.0 gm Morpholine | 0.17 | 0.06 |
| 1.5 gm Morpholine | 0.08 | <0.03 |

EXAMPLE 4

The above examples may be repeated using copolymers of ethyl acrylate instead of methyl acrylate and generally similar results will be obtained.

I claim:
1. A composition comprising (a) a copolymer containing polymerized ethylene units, polymerized alkyl acrylate units and polymerized units of a monoalkyl ester of 1,4-butenedioic acid, said alkyl acrylate units being selected from the class consisting of methyl acrylate and ethyl acrylate, the alkyl group of the monoalkyl ester having 1 to 6 carbon atoms, said alkyl acrylate units being present in the amount of 40 to 65% by weight of the polymer, said monoalkyl ester units being present in the amount of 1 to 10% by weight of the polymer, said ethylene units being present in a complemental amount, said polymer having a melt index of 0.3 to 100 grams/10 min. and (b) a compound having the formula

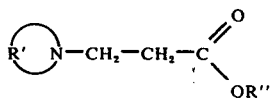

where R' is an organic diradical containing at least 4 carbon atoms, and R'' is an alkyl group of the same size as the alkyl group of the alkyl acrylate, said compound being present in the amount of between about 0.15 and 2% by weight of the composition said compound having been formed by the reaction of monomeric alkyl acrylate entrained in the copolymer and a secondary amine having the formula

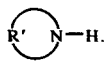

2. The composition of claim 1 in which the polymerized units are randomly distributed in the polymeric molecules.

3. The composition of claim 2 which also contains 0.3 to 5 parts per 100 parts by weight of copolymer of a polybutadiene resin having a molecular weight of about 1000 to 3000 and above about 85% by weight pendant vinyl groups.

4. The composition of claim 3 also containing fillers.

5. The composition of claim 1 in which the polymerized alkyl acrylate units are methyl acrylate, in which the monoalkyl ester of 1,4-butenedioic acid is ethyl hydrogen maleate, in which R' has the formula —(CH$_2$)$_2$—O—(CH$_2$)$_2$— and in which R'' is methyl, and in which the concentration of the (b) component in the composition is 0.2 to 1% by weight of the composition.

6. The process for reducing the odor of a polymer of ethylene, alkyl acrylate and a monoalkyl ester of 1,4-butenedioic acid where the alkyl acrylate is selected from the class consisting of methyl acrylate and ethyl acrylate, and the alkyl groups of the ester contain 1 to 6 carbon atoms, containing minor amounts of the monomeric alkyl acrylate, which comprises combining with the polymer a secondary amine having the formula

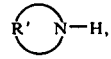

where R' is an organic diradical having at least 4 carbon atoms, under conditions such that at least a portion of the alkyl acrylate monomer reacts with the secondary amine to form a compound having the formula

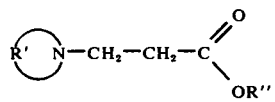

where R'' is an alkyl group of the same size as the alkyl group of the alkyl acrylate.

7. The process of claim 6 in which the amount of secondary amine added to the polymer is at least equal on a mole basis to the amount of monomeric alkyl acrylate present in the copolymer.

8. The process of claim 7 in which the amount of secondary amine added to the polymer is on a mole basis from 1 to 3 times the amount of monomeric alkyl acrylate present.

9. The process of claim 8 in which the secondary amine is selected from the class consisting of morpholine, pyrrolidine, piperidine, homopiperidine, 1,2,3,4-tetrahydroisoquinoline, ethyl isonipecotate, α-pipecoline, 4-benzylpiperidine, 1-benzylpiperazine, and 1,2,3,6-tetrahydropyridine, the alkyl acrylate is methyl acrylate, and the addition to the polymer is carried out while the polymer is at a temperature between about 25° C. and 180° C.

10. The process of claim 9 in which the monomeric methyl acrylate content of the polymer is about 0.3 to 1% by weight of the polymer prior to the combining with the secondary amine.

* * * * *